United States Patent [19]

Nayebi et al.

[11] Patent Number: 5,675,392
[45] Date of Patent: Oct. 7, 1997

[54] MIXER WITH COMMON-MODE NOISE REJECTION

[75] Inventors: Mehrdad Nayebi, Palo Alto; Duc Ngo, San Jose, both of Calif.

[73] Assignees: Sony Corporation, Tokyo, Japan; Sony Electronics, Inc., Park Ridge, N.J.

[21] Appl. No.: 584,926

[22] Filed: Jan. 11, 1996

Related U.S. Application Data

[60] Provisional application No. 60/000,369 June 21, 1995.

[51] Int. Cl.$^6$ .................................................. H04N 9/74
[52] U.S. Cl. ............................ 348/584; 348/585; 348/598
[58] Field of Search .................................. 348/584, 585, 348/588, 598; H04N 9/74, 9/76

[56] References Cited

U.S. PATENT DOCUMENTS

| | | | |
|---|---|---|---|
| 4,404,583 | 9/1983 | Tatami | 358/13 |
| 4,794,457 | 12/1988 | Gillet . | |
| 5,068,626 | 11/1991 | Takagi et al. | 331/17 |
| 5,153,530 | 10/1992 | Takagi et al. | 331/17 |
| 5,233,316 | 8/1993 | Yamada et al. | 331/45 |

*Primary Examiner*—Sherrie Hsia
*Attorney, Agent, or Firm*—Haverstock & Associates

[57] ABSTRACT

A mixer circuit with common-mode noise rejection combines input signals into a single output signal in a predetermined ratio and reduces the effect of noise within the single output signal. The input signals and their respective ground signals are all coupled to the mixer circuit. The mixer circuit eliminates common-mode noise within the output signal, caused by each input signal having a different ground reference signal, by passing each input signal differentially with its respective ground reference signal to a standard Gilbert Cell. Mixer control signals are coupled as control inputs to the Gilbert Cell for controlling the ratio of the input signals included in the output signal. The Gilbert Cell receives the differential input signals and outputs a differential output signal comprised of a predetermined ratio of the input signals as specified by the control signals. The differential output signal is then converted to a single ended output signal. After being converted to a single ended output voltage, the single ended output signal is passed through an output buffer and provided as the output signal. Each of the differential input signals are generated by a transconductance stage and provided to differential pairs within the Gilbert Cell. The output signal is also provided to each transconductance stage as a feedback signal.

19 Claims, 6 Drawing Sheets

MIXER WITH COMMON-MODE NOISE REJECTION

RELATED APPLICATIONS

This application claims priority under 35 U.S.C. § 119(e) of the co-pending U.S. provisional application Ser. No. 60/000,369 filed on Jun. 21, 1995 and entitled "Mixer With Common Mode Noise Rejection." The provisional application Ser. No. 60/000,369 filed on Jun. 21, 1995 and entitled "Mixer With Common Mode Noise Rejection" is also hereby incorporated by reference.

1. Field of the Invention

The present invention relates to the field of mixing two signals together. In particular, the present invention relates to the field of mixing two input signals from different integrated circuits in a predetermined ratio into a combined output signal.

2. Background of the Invention

Figure 1:
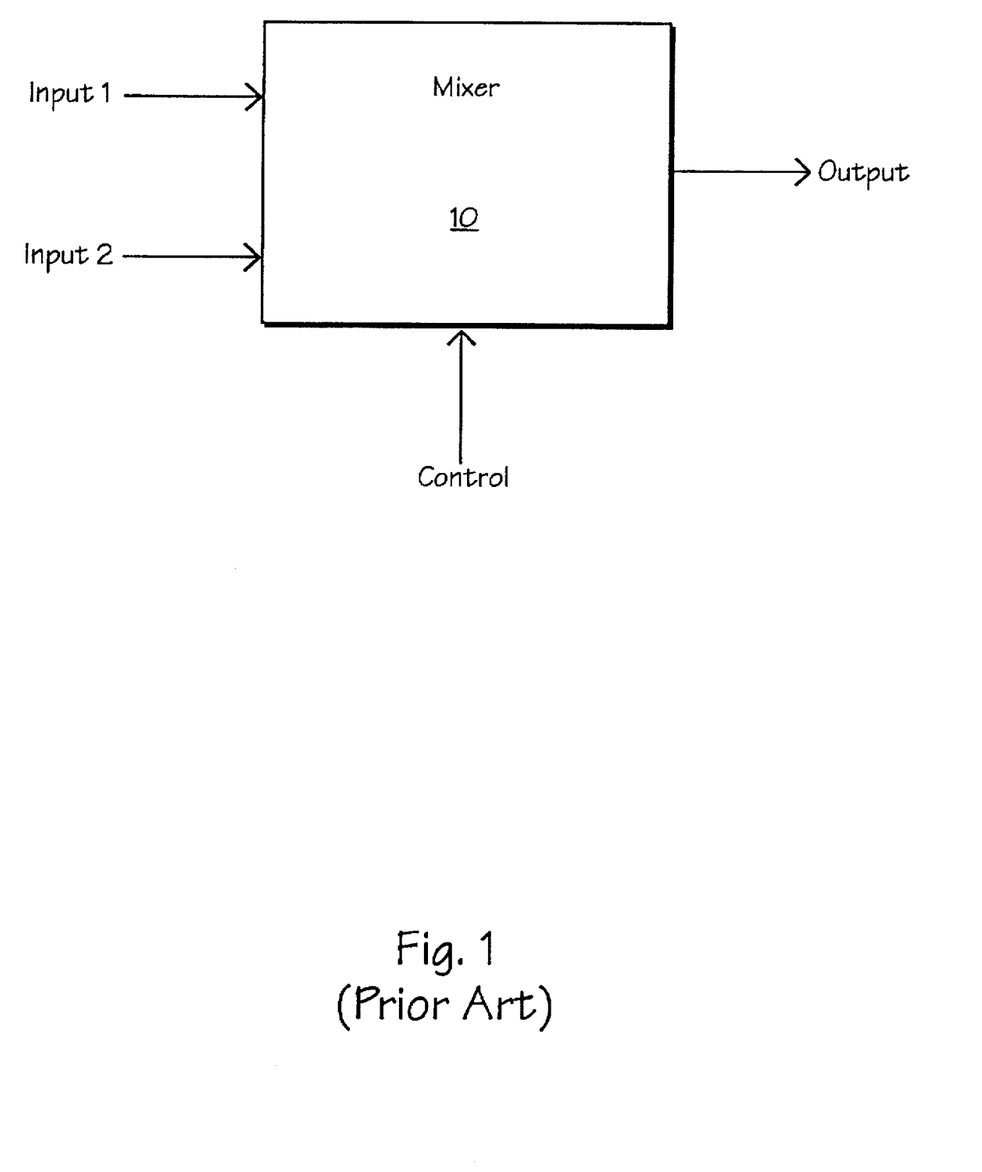
FIG. 1 illustrates a mixer circuit of the prior art.

A mixer circuit, as illustrated in FIG. 1, mixes two input signals together in a predetermined ratio forming an output signal. The mixing of the two input signals is controlled by a control signal which specifies the ratio of the input signals. Input signals Input1 and Input2 are coupled as inputs to the mixer circuit 10. A control signal Control is coupled as a control input to the mixer circuit 10 for controlling the mixing ratio of the two input signals Input1 and Input2. The mixer circuit 10 outputs an output signal Output which is a combination of the two input signals Input1 and Input2 in a predetermined ratio, as specified by the control signal Control. In this manner the mixer circuit 10 combines the two input signals Input1 and Input2 into a single output signal Output.

When either or both of the two input signals Input1 and Input2 are provided to the mixer circuit 10 from a separate integrated circuit, noise may be introduced into the output signal Output causing the output signal Output to be in error or perhaps distorted. This noise results because the level of the input signals Input1 and Input2 will each be in reference to a different ground reference signal when coupled from separate integrated circuits. The mixer circuit 10 has a separate ground reference signal. Each of the ground reference signals corresponding to each of the input signals Input1 and Input2 may be different than the ground reference signal of the mixer circuit 10. Thus, the level of each input signal Input1 and Input2 may be correct with respect to its own ground reference signal but may be in error with respect to the ground reference signal of the mixer circuit 10. Accordingly, when the input signals Input1 and Input2 are combined by the mixer circuit 10 generating the output signal Output, the different ground reference levels of each of the signals, will cause noise or distortion to be introduced into the output signal Output. This noise or distortion will degrade the quality of the output signal Output. What is needed is a mixer circuit which eliminates the effect of noise within an output signal resulting from the combination of input signals from different integrated circuits.

SUMMARY OF THE INVENTION

A mixer circuit with common-mode noise rejection combines input signals into a single output signal in a predetermined ratio and reduces the effect of noise within the single output signal. The input signals and their respective ground signals are all coupled to the mixer circuit. The mixer circuit eliminates common-mode noise within the output signal, caused by each input signal having a different ground reference signal, by passing each input signal differentially with its respective ground reference signal to a standard Gilbert Cell. Mixer control signals are coupled as control inputs to the Gilbert Cell for controlling the ratio of the input signals included in the output signal. The Gilbert Cell receives the differential input signals and outputs a differential output signal comprised of a predetermined ratio of the input signals as specified by the control signals. The differential output signal is then converted to a single ended output signal. After being converted to a single ended output voltage, the single ended output signal is passed through an output buffer and provided as the output signal. Each of the differential input signals are generated by a transconductance stage and provided to differential pairs within the Gilbert Cell. The output signal is also provided to each transconductance stage as a feedback signal.

DETAILED DESCRIPTION OF THE PREFERRED EMBODIMENT

Figure 2:
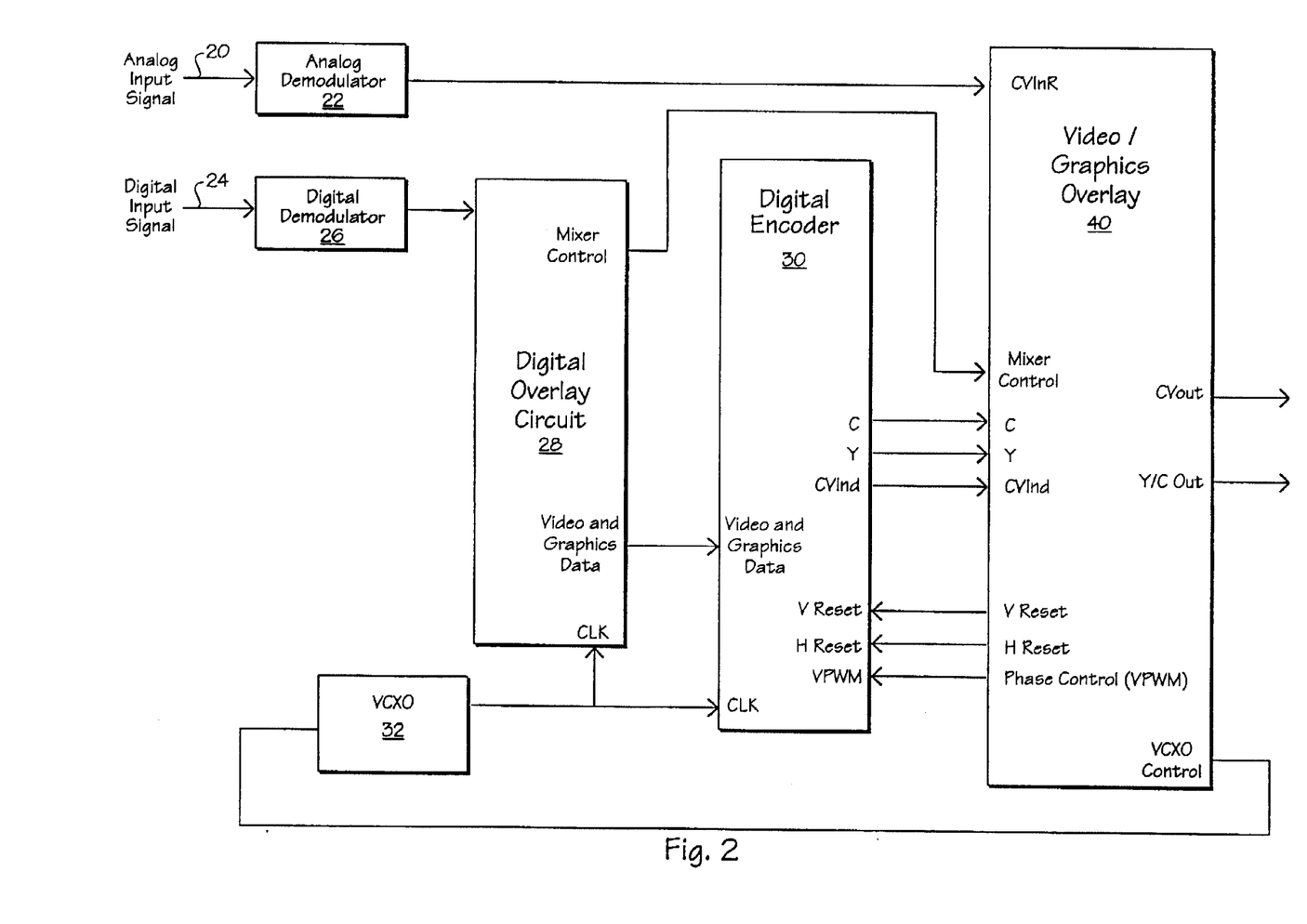
FIG. 2 illustrates a block diagram circuit schematic of a video display system according to the present invention.

A block diagram circuit schematic of a video display system according to the present invention is illustrated in FIG. 2. An analog input video signal is input to an analog demodulator 22 on a signal line 20. An output of the analog demodulator 22 is coupled as an analog input composite video signal CVInR to a video/graphics overlay integrated circuit 40. A digital input video signal is input to a digital demodulator 26 on a signal line 24. An output of the digital demodulator 26 is coupled as an input to a digital overlay control circuit 28. A video and graphics data output of the digital overlay control circuit 28 is coupled as an input to a digital encoder 30 to provide the digital video signal to the digital encoder 30. A mixer control output of the digital overlay circuit 28 is coupled as an input to the video/graphics overlay integrated circuit 40. A voltage controlled oscillator (VCXO) 32 is coupled to provide a clock input signal to the digital overlay control circuit 28 and the digital encoder integrated circuit 30. The VCXO 32 is controlled by a control signal VCXO Control output from the video/graphics overlay integrated circuit 40. The digital encoder integrated circuit 30 encodes the video and graphics data received from the digital overlay control circuit 28 into an analog format composite video signal, which will be referred to as a digital input composite video signal CVInd, or a Y/C video signal (S-Video), depending on the format of the video and graphics data input. The digital encoder integrated circuit 30 is coupled to provide the digital input composite video signal CVInd, the chrominance output signal C and the luminance output signal Y, as inputs to the video/graphics overlay integrated circuit 40. The video/ graphics overlay integrated circuit 40 is coupled to provide control signals VReset, HReset and Phase Control (VPWM) as inputs to the digital encoder integrated circuit 30.

The video/graphics overlay integrated circuit 40 of the present invention is configured to receive the analog input composite video signal CVInR and the digital input composite video signal CVInd which are combined in a predetermined format into an output composite video signal CVout. The video/graphics overlay integrated circuit 40 is configured for providing the output composite video signal CVout to a display system, such as a television. The video/graphics overlay integrated circuit 40 also provides Y/C video output signals to output a Y/C format video signal. If a Y/C format video signal is received by the video/graphics overlay integrated circuit 40 from the digital encoder integrated circuit 30 then the video/graphics overlay integrated circuit 40 will pass the Y and C signals through to the Y/C output and provide them in a purely digital format.

The digital video signal can comprise digital video, graphics data or both. In the preferred embodiment of the present invention, the composite video output signal CVout can contain analog video only, analog video with graphics, digital video only, digital video with graphics and graphics only. The contents of the output signal CVout and the mixture or ratio of the output is controlled by the mixer control signals provided from the digital overlay control circuit 28. The digital video and graphics data are encoded into an analog format composite video signal using the digital encoder integrated circuit 30 and output as the digital input composite video signal CVInd. The digital input composite video signal CVInd is coupled as an input to the video/graphics overlay integrated circuit 40. If the composite video output signal CVout is to contain both analog and digital video information, then the analog video signal CVInR and the digital composite video signal CVInd are combined by the video/graphics overlay integrated circuit 40 using a predetermined ratio of signals, as specified by the mixer control signals, and output as the analog format composite video output signal CVout. It should be understood that when the digital input composite video signal CVInd is discussed herein, an analog format composite video signal representing the digital video and graphics signal received by the digital encoder integrated circuit 30 from the digital overlay control circuit 28, is being referred to.

When only a pure analog video signal is to be output by the video/graphics overlay integrated circuit 40, the analog input video signal CVInR is passed through the video/graphics overlay integrated circuit 40 and output as the composite video output signal CVout, without any mixing or encoding. Correspondingly, when only a pure digital, graphics or combined digital and graphics signal is to be output by the video/graphics overlay integrated circuit 40, the digital composite video signal CVInd, received from the digital encoder integrated circuit 30, is passed through the video/graphics overlay integrated circuit 40 and output as the composite video output signal CVout, without any mixing. When the mixer control signals specify that the composite video output signal CVout is to contain a predetermined portion of the analog input composite video signal CVInR and a predetermined portion of the digital input composite video signal CVInd, then the signals CVInR and CVInd are combined by the video/graphics overlay integrated circuit 40 into the output composite video signal CVout.

The mixer control signals consist of three signal lines M0, M1 and $\alpha$. The mixer control signals M0 and M1 specify the content of the output composite video signal CVout and the signal $\alpha$ specifies the ratio of the analog input composite video signal CVInR to the digital input composite video signal CVInd, if both are to be combined. If a digital input video signal and graphics are to be combined into the digital input composite video signal CVInd, this is done by the digital overlay control circuit 28 and provided to the digital encoder integrated circuit 30 at the video and graphics data input. The following table illustrates the relationship of the mixer control signals M0, M1 and $\alpha$ to the contents of the output composite video signal CVout within the preferred embodiment of the present invention.

TABLE I

| M0 | M1 | CVout |
|---|---|---|
| L | L | CVout = $\alpha$CVInR + (1 – $\alpha$)CVInd |
| H | L | CVout = CVInR |
| L | H | CVout = CVInd |
| H | H | Not used |

As Table I illustrates, when both of the mixer control signals M0 and M1 are at a logical low voltage level the output composite video signal CVout comprises a level of the analog input composite video signal CVInR equal to the level of the signal $\alpha$ and a level of the digital input composite video signal CVInd equal to the level of one minus the level of the signal $\alpha$. When the mixer control signal M0 is at a logical high voltage level and the mixer control signal M1 is at a logical low voltage level the output composite video signal CVout comprises only the analog input composite video signal CVInR. When the mixer control signal M0 is at a logical low voltage level and the mixer control signal M1 is at a logical high voltage level the output composite video signal CVout comprises only the digital input composite video signal CVInd.

Figure 3:
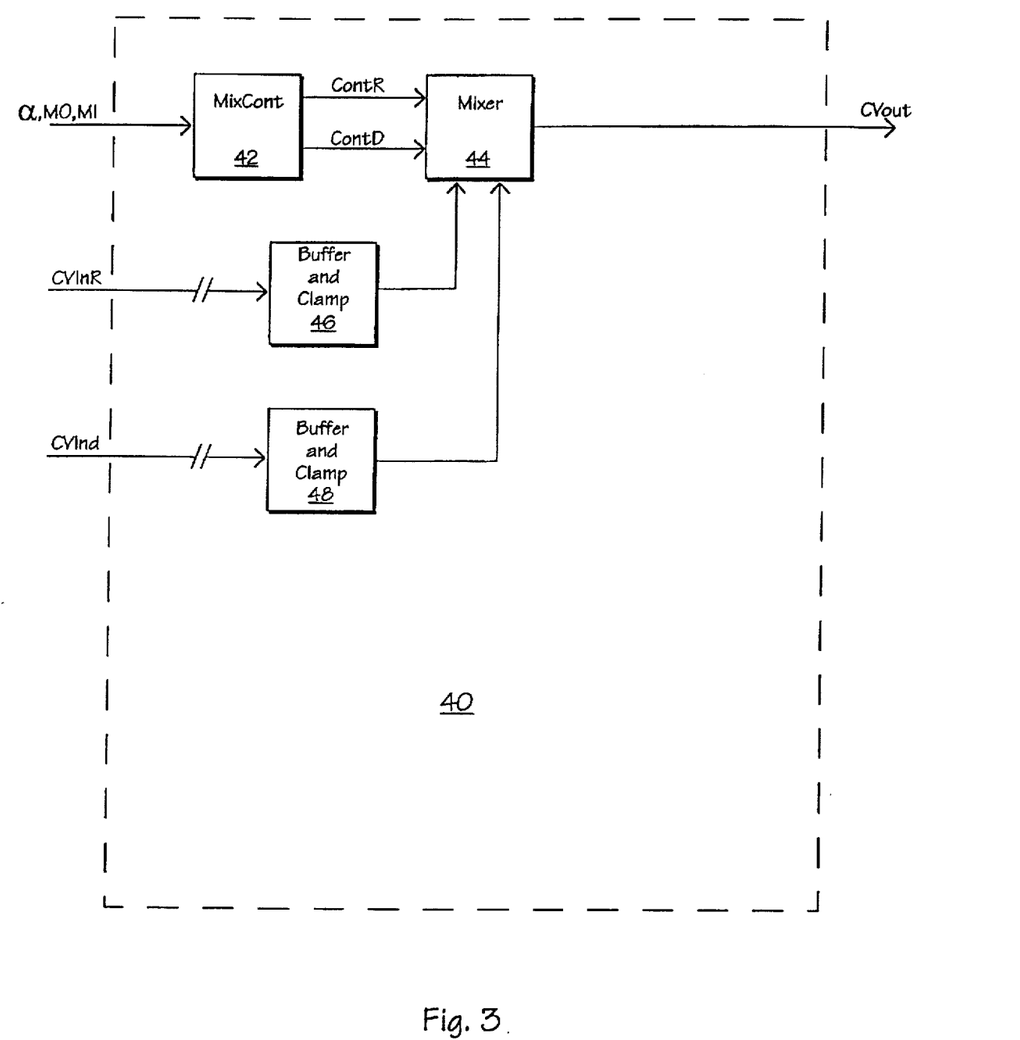
FIG. 3 illustrates a block diagram schematic of a mixer circuit within a video/graphics overlay integrated circuit.

A block diagram schematic of relevant portions of the mixer circuit within the video/graphics overlay integrated circuit 40 is illustrated in FIG. 3. The mixer control signals M0, M1 and $\alpha$ are coupled as inputs to a mixer control circuit 42. Content signals ContR and ContD are generated by the mixer circuit 44 in response to the mixer control signals M0, M1 and $\alpha$. The content signals ContR and ContD are output from the mixer control circuit 42 and coupled as inputs to the mixer circuit 44. The content signal ContR corresponds to the mixer control signal $\alpha$ and specifies the percentage of the output composite video signal CVout which is made up by the analog input composite video signal CVInR. The content signal ContD corresponds to a value of one minus the mixer control signal $\alpha$ and specifies the percentage of the output composite video signal CVout which is made up by the digital input composite video signal CVInd.

The analog input composite video signal CVInR from the analog demodulator 22 is coupled as an input to a buffer and clamping circuit 46. The digital input composite video signal CVInd from the digital encoder circuit 30 is coupled as an input to a buffer and clamping circuit 48. An output of the buffer and clamping circuit 46 is coupled as an input to the mixer circuit 44 in order to provide the analog input composite video signal CVInR to the mixer circuit 44. An output of the buffer and clamping circuit 48 is coupled as an input to the mixer circuit 44 in order to provide the digital input composite video signal CVInd to the mixer circuit 44. The composite video output signal CVout is output from the mixer circuit 44.

Figure 4:
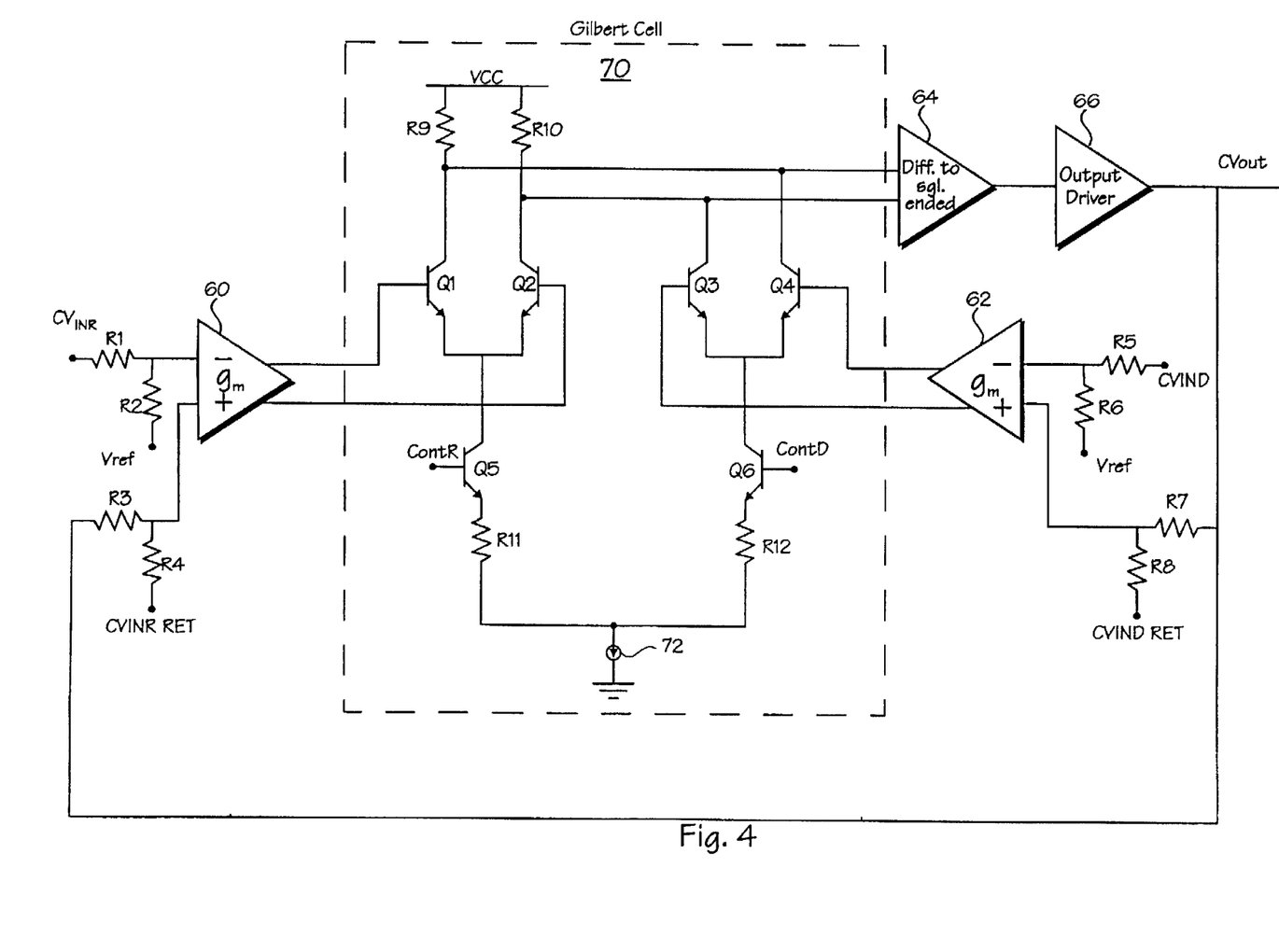
FIG. 4 illustrates a detailed schematic of a differential mixer of the present invention.

A detailed schematic block diagram of the mixer circuit 44 is illustrated in FIG. 4. The analog input composite video signal CVInR is coupled to the first terminal of a resistor R1. The second terminal of the resistor R1 is coupled to the first terminal of a resistor R2 and to the inverting input of a transconductance amplifier stage 60. The second terminal of the resistor R2 is coupled to the ground reference signal Vref of the mixer circuit. The digital input composite video signal CVInd is coupled to the first terminal of a resistor R5. The second terminal of the resistor R5 is coupled to the first terminal of a resistor R6 and to the inverting input of a transconductance amplifier stage 62. The second terminal of the resistor R6 is coupled to the ground reference signal Vref of the mixer circuit.

The analog input composite video ground reference signal CVInR Ret is coupled to the first terminal of a resistor R4. The analog input composite video ground reference signal CVInR Ret is input to the video/graphics overlay integrated circuit 40 with the analog input composite video signal CVInR from the analog demodulator circuit 22. The second terminal of the resistor R4 is coupled to the non-inverting input of the transconductance amplifier 60 and to the first terminal of a resistor R3. The digital input composite video ground reference signal CVInd Ret is coupled to the first terminal of a resistor R8. The digital input composite video ground reference signal CVInd Ret is input to the video/graphics overlay integrated circuit 40 with the digital input composite video signal CVInd from the digital encoder integrated circuit 30. The second terminal of the resistor R8 is coupled to the non-inverting input of the transconductance amplifier 62 and to the first terminal of a resistor R7.

The differential output from the transconductance amplifier 60 representing the analog input composite video signal CVInR is input to the Gilbert Cell mixing circuit 70 and coupled differentially to the base of an npn transistor Q1 and to the base of an npn transistor Q2. The differential output from the transconductance amplifier 62 representing the digital input composite video signal CVInd is input to the Gilbert Cell mixing circuit 70 and coupled differentially to the base of an npn transistor Q3 and to the base of an npn transistor Q4. The Gilbert Cell mixing circuit 70 is a standard Gilbert Cell which accepts the differential input signals, mixes them in a ratio controlled by the content signals ContR and ContD and outputs a differential output signal. Together, the transistors Q1 and Q2 form a differential pair. The transistors Q3 and Q4 also form a differential pair.

The collector of the transistor Q1 is coupled to the first terminal of a resistor R9, to the collector of the transistor Q4 and to the input of a differential-to-single ended amplifier circuit 64. The collector of the transistor Q2 is coupled to the first terminal of a resistor R10, to the collector of the transistor Q3 and to the input of the differential-to-single ended amplifier circuit 64. The second terminal of the resistor R9 and the second terminal of the resistor R10 are coupled to a supply voltage VCC. The emitter of the transistor Q1 is coupled to the emitter of the transistor Q2 and to the collector of an npn transistor Q5. The emitter of the transistor Q5 is coupled to the first terminal of a resistor R11. The content signal ContR is coupled to the base of the transistor Q5. The emitter of the transistor Q3 is coupled to the emitter of the transistor Q4 and to the collector of an npn transistor Q6. The emitter of the transistor Q6 is coupled to the first terminal of a resistor R12. The content signal ContD is coupled to the base of the transistor Q6. The second terminal of the resistor R11 is coupled to the second terminal of the resistor R12 and to the first terminal of a current source 72. The second terminal of the current source 72 is coupled to ground.

The differential output of the Gilbert Cell 70 is coupled as a differential input to the differential-to-single ended amplifier circuit 64. The single ended output of the differential-to-single ended amplifier 64 is coupled as an input to the output driver circuit 66. The output of the output driver circuit 66 provides the output composite video signal CVout. The output of the output driver circuit 66 is coupled to the second terminal of the resistor R3 and to the second terminal of the resistor R7 to provide a feedback path from the output.

The analog input composite video signal CVInR is clean with respect to its corresponding ground signal CVInR Ret but may be extremely noisy with respect to the ground reference signal Vref of the mixer circuit 44. The digital input composite video signal CVInd is clean with respect to its corresponding ground signal CVInd Ret but may also be extremely noisy with respect to the ground reference signal Vref of the mixer circuit 44. For these reasons and in order to minimize the noise within the composite video output signal CVout the mixer circuit 44 of the present invention receives both the composite video signals CVInR and CVInd as well as their respective ground signals CVInR Ret and CVInd Ret as inputs. The mixer circuit 44 then eliminates the common mode noise due to each signal having a different ground signal by subtracting the respective ground reference signals from the appropriate composite video signals using a differential amplifier and then combining the input composite video signals into a combined output composite video signal. The mixer circuit 44 mixes the composite video signals CVInR and CVInd as specified by the content signals ContR and ContD. Once the signals are combined, the differential output of the mixer circuit 44 is converted to a single ended output, passed through an output driver 66 and output as the composite video output signal CVout.

Figure 5:
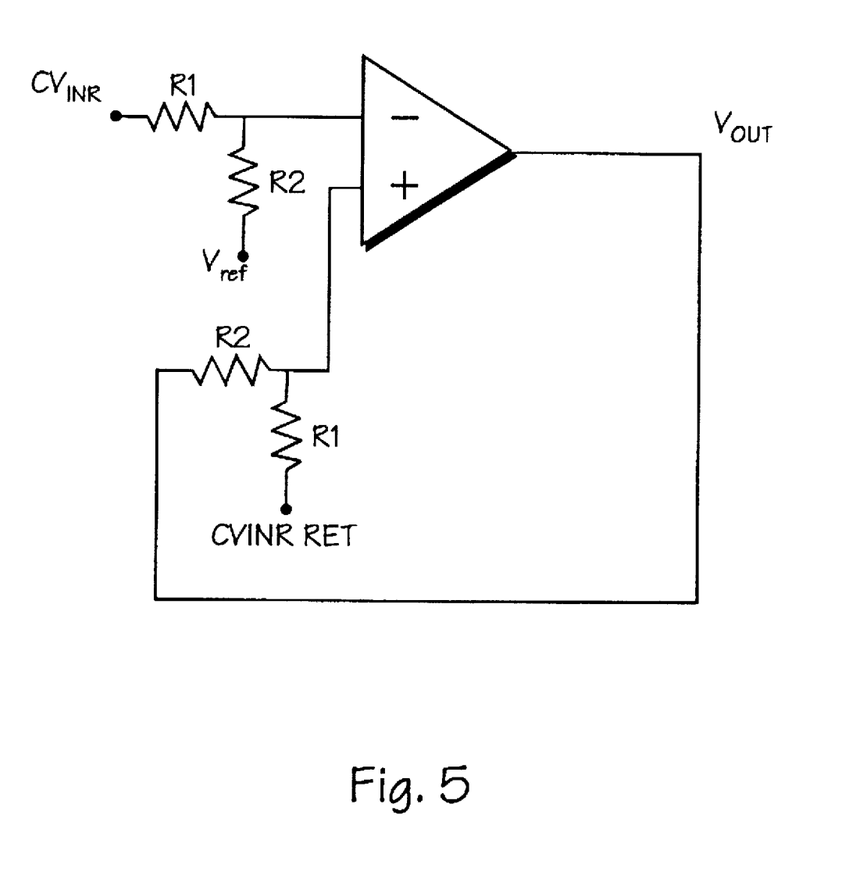
FIG. 5 illustrates a schematic of an equivalent circuit from the perspective of one of the input signals to the differential mixer.

Within the Gilbert mixing cell 70 the transistors Q1 and Q2 form a differential pair with inputs from the transconductance amplifier stage 60 representing the analog input composite video signal CVInR. The transistors Q3 and Q4 form a differential pair with inputs from the transconductance amplifier stage 62 representing the digital input composite video signal CVInd. From the perspective of each of the composite video input signals CVInR and CVInd to the composite video output signal CVout, the mixer circuit is equivalent to an operational amplifier with two feedback paths. This equivalent circuit from the perspective of the analog input composite video signal CVInR is illustrated in FIG. 5. As illustrated, in the preferred embodiment of the present invention, the values of the resistors R3 and R4 are equal to the values of the resistors R2 and R1, respectively. The input/output relationship of this equivalent circuit is illustrated by the following equation:

$$V_{out} = R1/R2 \times (CV_{InR} - CV_{InR\ Ret})$$

Because the analog input composite video ground reference signal CVInR Ret is being subtracted from the analog input composite video signal CVInR, any common mode noise will be cancelled out and the signal to noise ratio of the mixer circuit 44 will be improved significantly over a single-ended circuit of the prior art. The equivalent circuit from the perspective of the digital input composite video signal CVInd functions similarly, cancelling out any common mode noise and greatly improving the signal to noise ratio of the circuit. Also, in the preferred embodiment of the present invention, in the equivalent circuit from the perspective of the digital input composite video signal CVInd, the values of the resistors R7 and R8 are equal to the values of the resistors R6 and R5, respectively.

The transistors Q5 and Q6 form a differential pair which controls the operation of the two input differential pairs, formed by the transistors Q1 and Q2 and the transistors Q3 and Q4, and thereby controls the mixing of the composite video input signals CVInR and CVInd into the composite video output signal CVout. The content signal ContR corresponds to the mixer control signal α and specifies the percentage of the output composite video signal CVout which is to comprise the analog input composite video signal CVInR. The content signal ContD corresponds to a value of one minus the mixer control signal α and specifies the percentage of the output composite video signal CVout which is to comprise the digital input composite video signal CVInd. Together, the percentage specified by the content signal ContR and the percentage specified by the content signal ContD will equal the total amount of the composite video output signal CVout. The content signal ContR causes an appropriate corresponding strength signal to be output from the differential pair formed by the transistors Q1 and Q2. The content signal ContD causes an appropriate corresponding strength signal to be output from the differential pair formed by the transistors Q3 and Q4. The composite video input signals CVInR and CVInd are combined, as controlled by the content signals ContR and ContD, into the differential output signal which is output from the Gilbert Cell mixing circuit 70 and input to the differential-to-single ended circuit 64. The differential-to-single ended circuit 64 then converts the differential output signal to a single ended output signal. The single ended output from the differential-to-single ended circuit 64 is passed through the output driver circuit 66 and provided as the output composite video signal CVout representative of the combined input composite video signals CVInR and CVInd.

In this manner both analog video and digital video may be combined into the single output composite video signal CVout. The mixer circuit 44 of the present invention mixes the analog input composite video signal CVInR and the digital input composite video signal CVInd together into the composite video output signal CVout using the input signals CVInR and CVInd and their respective ground reference signals CVInR Ret and CVInd Ret. By passing both the input signals CVInR and CVInd and their respective ground reference signals CVInd Ret and CVInd Ret through a transconductance amplifier stage into the Gilbert Cell mixing circuit 70, any common mode noise will be eliminated. The signal to noise ratio of the mixer circuit 44 of the present invention is also improved by the use of the differential signals.

Figure 6:
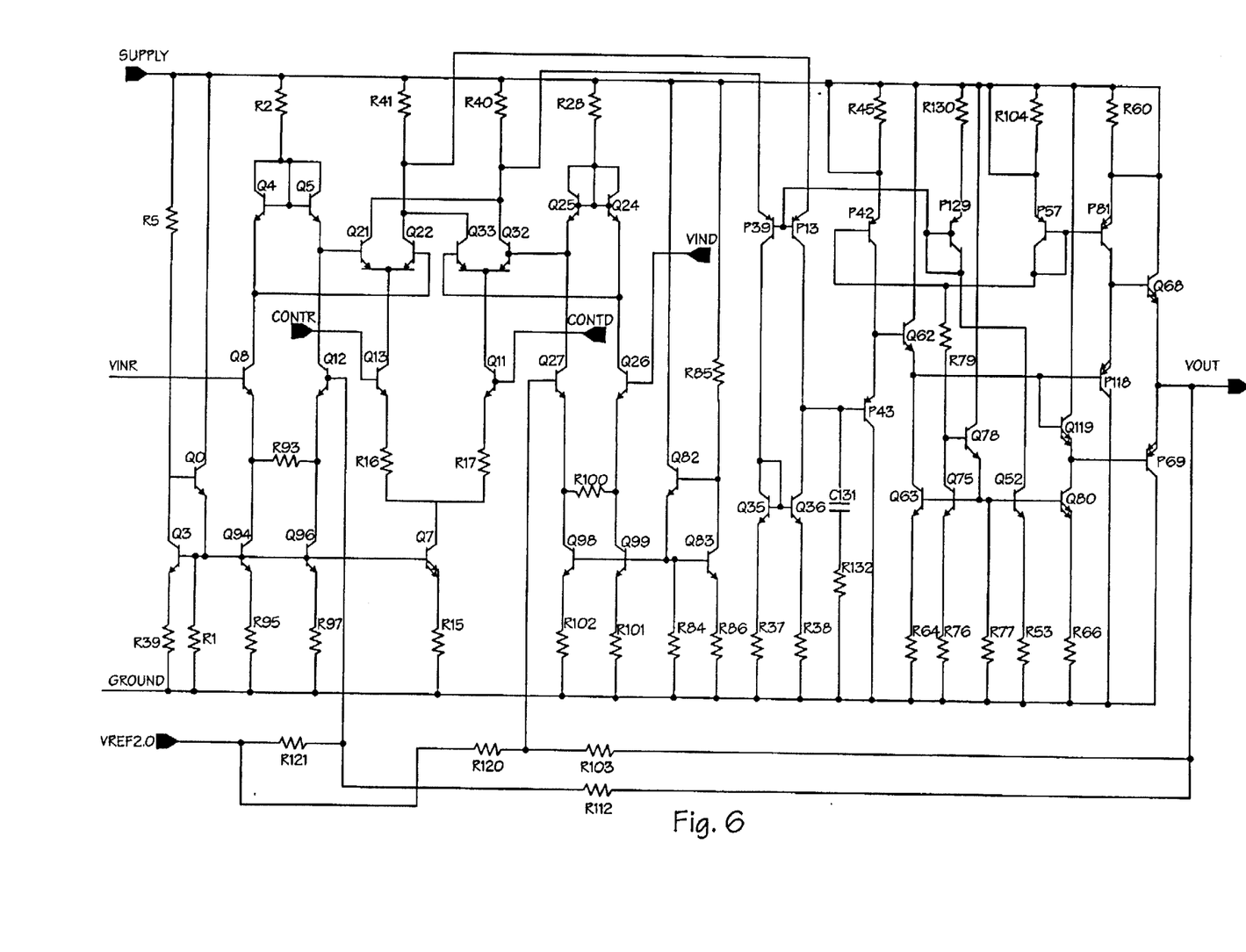
FIG. 6 illustrates a detailed schematic diagram of the preferred embodiment of the differential mixer of the present invention.

A detailed circuit schematic of the preferred embodiment of the mixer with common-mode noise rejection is illustrated in FIG. 6. The preferred embodiment of the present invention is implemented within a video/graphics overlay integrated circuit, Part No. CXA2015Q, which will be available from Sony Corporation of America, 3300 Zanker Road, San Jose, Calif. 95134. Within this integrated circuit, a mixer circuit is used to mix an analog input composite video signal and a digital input composite video signal into a combined output composite video signal.

While the preferred embodiment of the present invention has been illustrated and described as an integrated circuit using bipolar transistors, it will be apparent to a person of ordinary skill in the art that the circuit of the present invention may be implemented using another device technology, including but not limited to CMOS, MOS, discrete components and ECL. It will also be apparent to those skilled in the art that different logic circuit configurations could be substituted for the logic circuit described above to perform the functions of the preferred embodiment.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. A video mixer circuit for receiving a plurality of input video signals and combining the plurality of input video signals into an output video signal comprising:

a. a plurality of receiving circuits each configured for receiving one of a plurality of input video signals and respective ground reference signals and generating a differential signal representative of a difference between the input video signal and the respective ground reference signal; and b. a mixing circuit coupled to each of the plurality of receiving circuits for receiving each of the differential signals and combining the differential signals in a predetermined ratio into the output video signal.

2. The video mixer circuit as claimed in claim 1 wherein the mixing circuit is configured for receiving a plurality of content signals each corresponding to an appropriate one of the differential signals.

3. The video mixer circuit as claimed in claim 2 wherein the corresponding content signal represents a percentage of the output video signal which is to include the appropriate one of the differential signals.

4. The video mixer circuit as claimed in claim 3 wherein the plurality of content signals together represent a composition of the output video signal.

5. The video mixer circuit as claimed in claim 1 further comprising a converting circuit coupled to the mixing circuit for converting the output video signal from a differential format signal to a single ended format signal.

6. The video mixer circuit as claimed in claim 1 wherein each of the plurality of receiving circuits comprise a transconductance amplifier stage for generating the differential signal representative of the difference between the input video signal and the respective ground reference signal.

7. The video mixer circuit as claimed in claim 6 wherein the mixing circuit comprises a Gilbert cell.

8. A method of mixing a plurality of video input signals into a video output signal comprising the steps of:

a. receiving the plurality of video input signals and respective ground reference signals;

b. generating a plurality of differential signals each representative of a difference between one of the video input signals and a corresponding respective ground reference signal; and c. generating the video output signal including a predetermined ratio of the plurality of differential signals.

9. The method as claimed in claim 8 wherein the output video signal is a differential format signal.

10. The method as claimed in claim 9 further comprising the step of receiving a plurality of content signals each corresponding to an appropriate one of the differential signals and representing a percentage of the output video signal which is to include the appropriate one of the differential signals.

11. The method as claimed in claim 10 further comprising the step of converting the output video signal from a differential format into a single-ended format.

12. A video mixer circuit for receiving a first input video signal and a corresponding first ground reference signal and a second input video signal and a corresponding second ground reference signal and combining the first and second input video signals into an output video signal comprising:

a. a first transconductance amplifier stage configured for receiving the first input video signal and the corresponding first ground reference signal and generating a differential signal representative of a difference between the first input video signal and the first ground reference signal;

b. a second transconductance amplifier stage configured for receiving the second input video signal and the corresponding second ground reference signal and generating a second differential signal representative of a difference between the second input video signal and the second ground reference signal; and c. a mixing circuit coupled to receive the first differential signal and the second differential signal for generating the output video signal including a predetermined ratio of the first and second differential signals.

13. The video mixer circuit as claimed in claim 12 wherein the mixing circuit is configured for receiving a first content signal representing a percentage of the output video signal which is to include the first input video signal and a second content signal representing a percentage of the output video signal which is to include the second input video signal.

14. The video mixer circuit as claimed in claim 13 wherein the mixing circuit comprises a Gilbert cell.

15. A video display system for receiving video input signals and generating an output composite video signal comprising:

a. an analog input video receiving circuit configured for receiving an analog input signal and an analog ground reference signal and generating an analog differential signal representative of a difference between the analog input signal and the analog ground reference signal;

b. a digital input video receiving circuit configured for receiving a digital input signal and a digital ground reference signal and generating a digital differential signal representative of a difference between the digital input signal and the digital ground reference signal; and c. a mixing circuit configured for receiving an analog content signal representing a percentage of the output composite video signal which is to include the analog differential signal and for receiving a digital content signal representing a percentage of the output composite video signal which is to include the digital differential signal and coupled to receive the analog differential signal and the digital differential signal for combining the analog and digital differential signals in a predetermined ratio specified by the analog and digital content signals, respectively, into the output composite video signal.

16. The video display system as claimed in claim 15 wherein the mixing circuit comprises a Gilbert cell.

17. The video display system as claimed in claim 16 further comprising a converting circuit coupled to the mixing circuit for converting the output composite video signal from a differential signal to a single ended signal.

18. The video display system as claimed in claim 17 wherein the analog input video receiving circuit comprises an analog transconductance amplifier stage for generating the analog differential signal.

19. The video display system as claimed in claim 18 wherein the digital input video receiving circuit comprises a digital transconductance amplifier stage for generating the digital differential signal.

\* \* \* \* \*